(12) United States Patent
Griffin

(10) Patent No.: US 11,699,014 B2
(45) Date of Patent: Jul. 11, 2023

(54) SYSTEM AND METHOD FOR DETERMINING PATHS BETWEEN LOCATIONS IN A PHYSICAL SYSTEM

(71) Applicant: Insight Direct USA, Inc., Tempe, AZ (US)

(72) Inventor: Michael Griffin, Wayland, MA (US)

(73) Assignee: Insight Direct USA, Inc., Chandler, AZ (US)

( * ) Notice: Subject to any disclaimer, the term of this patent is extended or adjusted under 35 U.S.C. 154(b) by 181 days.

(21) Appl. No.: 17/162,394

(22) Filed: Jan. 29, 2021

(65) Prior Publication Data

US 2022/0245317 A1 Aug. 4, 2022

(51) Int. Cl.
| | | |
|---|---|---|
| G06F 7/50 | (2006.01) | |
| G06F 30/392 | (2020.01) | |
| G06F 30/13 | (2020.01) | |
| G06Q 50/28 | (2012.01) | |
| G06F 16/901 | (2019.01) | |
| G06F 111/04 | (2020.01) | |

(52) U.S. Cl.
CPC ........ *G06F 30/392* (2020.01); *G06F 16/9024* (2019.01); *G06F 30/13* (2020.01); *G06Q 50/28* (2013.01); *G06F 2111/04* (2020.01)

(58) Field of Classification Search
CPC .. G06F 2111/04; G06F 16/9024; G06F 30/13; G06F 30/39; G06F 30/392; G06F 2111/20; G06Q 50/28
USPC .................................. 716/110, 111, 119, 122
See application file for complete search history.

(56) References Cited

U.S. PATENT DOCUMENTS

| | | | | | |
|---|---|---|---|---|---|
| 5,378,904 | A * | 1/1995 | Suzuki | ................ | H01L 27/0207 326/39 |
| 6,035,106 | A * | 3/2000 | Carruthers | ............ | G06F 30/392 716/121 |
| 6,301,686 | B1 * | 10/2001 | Kikuchi | ................ | G06F 30/398 716/135 |
| 6,317,864 | B1 * | 11/2001 | Kikuchi | ................ | G06F 30/39 716/135 |
| 6,957,411 | B1 * | 10/2005 | Teig | ...................... | G06F 30/394 700/121 |
| 7,024,419 | B1 * | 4/2006 | Klenk | ..................... | H04L 41/22 707/999.102 |
| 7,080,336 | B2 * | 7/2006 | Teig | ...................... | G06F 30/392 716/124 |
| 7,310,786 | B2 * | 12/2007 | Yang | ..................... | G06F 30/392 716/135 |
| 7,437,691 | B2 * | 10/2008 | Tang | ........................ | G06F 30/18 716/132 |
| 7,904,848 | B2 * | 3/2011 | Coene | ................... | G06F 9/5066 716/113 |
| 7,921,392 | B2 * | 4/2011 | Furnish | ................... | G06F 30/39 716/110 |

(Continued)

*Primary Examiner* — Brian Ngo
(74) *Attorney, Agent, or Firm* — Kinney & Lange, P.A.

(57) ABSTRACT

Pathways between reference locations in a physical system are generated based on a layout table. Nodes and edges of the directed graph are associated with cell locations of the layout table. The cell locations define features of the reference locations. Parameters of the nodes and edges are defined based on descriptors recalled from the cells associated with the nodes and edges. The nodes and edges are configured based on the descriptors. Path data regarding potential pathways is generated based on the defined nodes and edges.

20 Claims, 10 Drawing Sheets

(56) References Cited

U.S. PATENT DOCUMENTS

| | | | | |
|---|---|---|---|---|
| 8,200,594 B1* | 6/2012 | Bleiweiss | | A63F 13/67 |
| | | | | 706/45 |
| 8,332,793 B2* | 12/2012 | Bose | | G06F 30/39 |
| | | | | 716/108 |
| 8,346,681 B2* | 1/2013 | Lauritsen | | G06N 5/042 |
| | | | | 706/45 |
| 8,352,397 B2* | 1/2013 | Rubin | | G06N 5/04 |
| | | | | 706/45 |
| 8,364,449 B2* | 1/2013 | Baccou | | G06F 30/33 |
| | | | | 703/2 |
| 8,599,218 B1* | 12/2013 | Milne | | G06F 9/451 |
| | | | | 345/592 |
| 9,477,380 B2* | 10/2016 | Amijee | | G06F 3/0482 |
| 9,740,792 B2* | 8/2017 | Wang | | G06F 16/986 |
| 10,460,062 B2* | 10/2019 | Feld | | G06F 30/34 |
| 10,803,224 B2* | 10/2020 | Shah | | G06F 30/392 |
| 10,880,273 B2* | 12/2020 | May | | H04L 51/48 |
| 11,194,793 B1* | 12/2021 | Srivastava | | G06F 16/93 |
| 2008/0163202 A1* | 7/2008 | Kembel | | H04L 67/306 |
| | | | | 707/E17.119 |
| 2009/0313189 A1* | 12/2009 | Sun | | G16B 5/00 |
| | | | | 706/46 |
| 2014/0068379 A1* | 3/2014 | Sakaue | | G06F 11/1012 |
| | | | | 714/764 |
| 2017/0147716 A1* | 5/2017 | Shirabe | | G06F 30/13 |
| 2018/0165400 A1* | 6/2018 | Feld | | G06F 30/34 |
| 2018/0306587 A1* | 10/2018 | Holz | | G01C 21/206 |
| 2020/0036687 A1* | 1/2020 | May | | H04W 12/02 |
| 2020/0097451 A1* | 3/2020 | Pisipati | | G06F 16/258 |
| 2020/0226512 A1* | 7/2020 | Epstein | | G06Q 10/0635 |
| 2021/0081504 A1* | 3/2021 | McCormick | | G06F 30/392 |
| 2021/0256370 A1* | 8/2021 | Ramachandran | | G06N 7/005 |
| 2021/0318671 A1* | 10/2021 | Janka | | G05B 19/41865 |
| 2021/0374563 A1* | 12/2021 | Jezewski | | G06F 40/247 |
| 2022/0193915 A1* | 6/2022 | Marinkovich | | B25J 9/1653 |
| 2022/0292543 A1* | 9/2022 | Henderson | | G06Q 30/0252 |

* cited by examiner

| | C1 | C2 | C3 | C4 | C5 | C6 | C7 | C8 | C9 | C10 |
|---|---|---|---|---|---|---|---|---|---|---|
| R1 | | | | | | | | | | wall |
| R2 | | | N | N | N | N | | EW | | wall |
| R3 | | | S | S | S | S | | | | wall |
| R4 | | | | | | | | EW | | wall |
| R5 | | | | | | | | | | wall |
| R6 | | | N | N | N | N | | EW | | wall |
| R7 | | | S | S | S | S | | | | wall |
| R8 | | | | | | | | EW | | wall |
| R9 | | | NS | | NS | NS | | | | wall |
| R10 | | | | | | | | | | wall |
| R11 | wall | wall | wall | wall | wall | wall | wall | wall | wall | wall |

FIG. 2B

|     | C1   | C2   | C3   | C4   | C5   | C6   | C7   | C8   | C9   | C10  |
| --- | ---- | ---- | ---- | ---- | ---- | ---- | ---- | ---- | ---- | ---- |
| R1  |      |      | EW   | EW   | EW   | EW   |      |      |      | wall |
| R2  |      |      | p01  | p02  | p07  | p04  |      | p21  | NS   | wall |
| R3  |      |      | p05  | p06  | p07  | p08  |      |      | NS   | wall |
| R4  |      |      |      |      |      |      |      | p22  | NS   | wall |
| R5  |      |      |      |      |      |      |      |      | NS   | wall |
| R6  |      |      | p09  | p10  | p11  | p12  |      | p23  | NS   | wall |
| R7  |      |      | p13  | p14  | p11  | p20  |      |      | NS   | wall |
| R8  |      |      |      |      |      |      |      | p24  | NS   | wall |
| R9  |      |      | p17  |      | p19  | p20  |      |      | NS   | wall |
| R10 |      |      | WE   | WE   | WE   | WE   |      |      |      | wall |
| R11 | wall | wall | wall | wall | wall | wall | wall | wall | wall | wall |

FIG. 2C

SYSTEM AND METHOD FOR DETERMINING PATHS BETWEEN LOCATIONS IN A PHYSICAL SYSTEM

BACKGROUND

This disclosure relates generally to navigation. More particularly, this disclosure relates to navigation between locations within defined areas of complex physical systems.

There are many possible paths for navigating between an origin point and a next point within complex physical systems, such as factories, warehouses, office buildings, neighborhoods, cities, etc. Determining shortest paths between locations within the system allows for route and task optimization. However, determining that shortest path between a given set of points is often a difficult and time-consuming task that requires highly skilled computational scientists to perform optimization within the complex systems. In addition, physical areas can routinely change (e.g., shelving can be moved, conveyor belts can be added or removed, intersections can be altered, new items can be stocked, etc.), rendering previously determined routes obsolete.

Cell-based representations (e.g., spreadsheets) of a system can be generated to provide a static model of the system. It is difficult, however, to incorporate complexity into such representations. A static cell-based representation may not reveal where complex interactions occur. For example, a cell-based representation can show that a certain pathway is free of traffic issues when, in fact, traffic jams often occur along that pathway in the real system.

SUMMARY

According to an aspect of the disclosure, a method of generating a pathway model for a physical system includes defining, by a computing device, components of a directed graph based on a first cell-based layout table. The first cell-based layout table defines reference locations within a bounded area of the physical system. Each component is one of a node of the directed graph and an edge of the directed graph. Each component is defined by associating, by the computing device, the component with a cell location of the first cell-based layout table; recalling, by the computing device, a first attribute descriptor from the layout table based on the cell location of the first cell-based layout table; and configuring, by the computing device, the component based on the first attribute descriptor. The method further includes generating, by the computing device, a plurality of pathways between the reference locations based on the defined components.

According to an additional or alternative aspect of the disclosure, a method of generating candidate pathways between locations within a physical system includes defining, by a computing device, components of a first directed graph based on a first cell-based layout table; defining, by the computing device, components of a second directed graph based on a second cell-based layout table; and generating, by the computing device, a pathway model of the physical system based on the defined components of the first directed graph and the defined component of the second directed graph. The first cell-based layout table defines reference locations within a first bounded area of the physical system. Each component of the first directed graph is one of a first node of the first directed graph and a first edge of the first directed graph. The second cell-based layout table defines reference locations within a second bounded area of the physical system. Each component of the second directed graph is one of a second node of the second directed graph and a second edge of the second directed graph.

According to another additional or alternative aspect of the disclosure, a system modeler configured to generate pathways between locations within a physical system includes a computing device including first control circuitry and a first memory. The computing device is configured to recall, from the first memory, a first cell-based layout table having cell locations associated with reference locations of the physical system; associate components of a directed graph with the cell locations; define properties of the components based on attribute identifiers taken from the cells of the first cell-based layout table; and generate path data based on the defined components. Each component is one of a node of the directed graph and an edge of the directed graph.

BRIEF DESCRIPTION OF THE DRAWINGS

FIG. 2B is a plan view of a layout table.
FIG. 2C is a plan view of a layout table.

DETAILED DESCRIPTION

This disclosure relates generally to modeling of and navigation within complex physical systems. Layout tables include attribute descriptors within cells of the layout tables. The cells are associated with locations within the physical system. The attribute descriptors provide rules defining the nature of the reference location associated with the cell that the attribute descriptor is within. Nodes of a directed graph are associated with the cell locations and edges of the directed graph connect adjacent nodes. The rules provided by the attribute descriptors define the properties of the nodes and edges associated with the cell location of the attribute descriptor. Candidate pathways between various locations of the physical system are generated based on the defined nodes and edges of the directed graph. A shortest route between any two or more locations within the physical system can be determined from among the candidate pathways. The shortest route information can be provided to a user to facilitate navigation within the physical system.

Figure 1A:
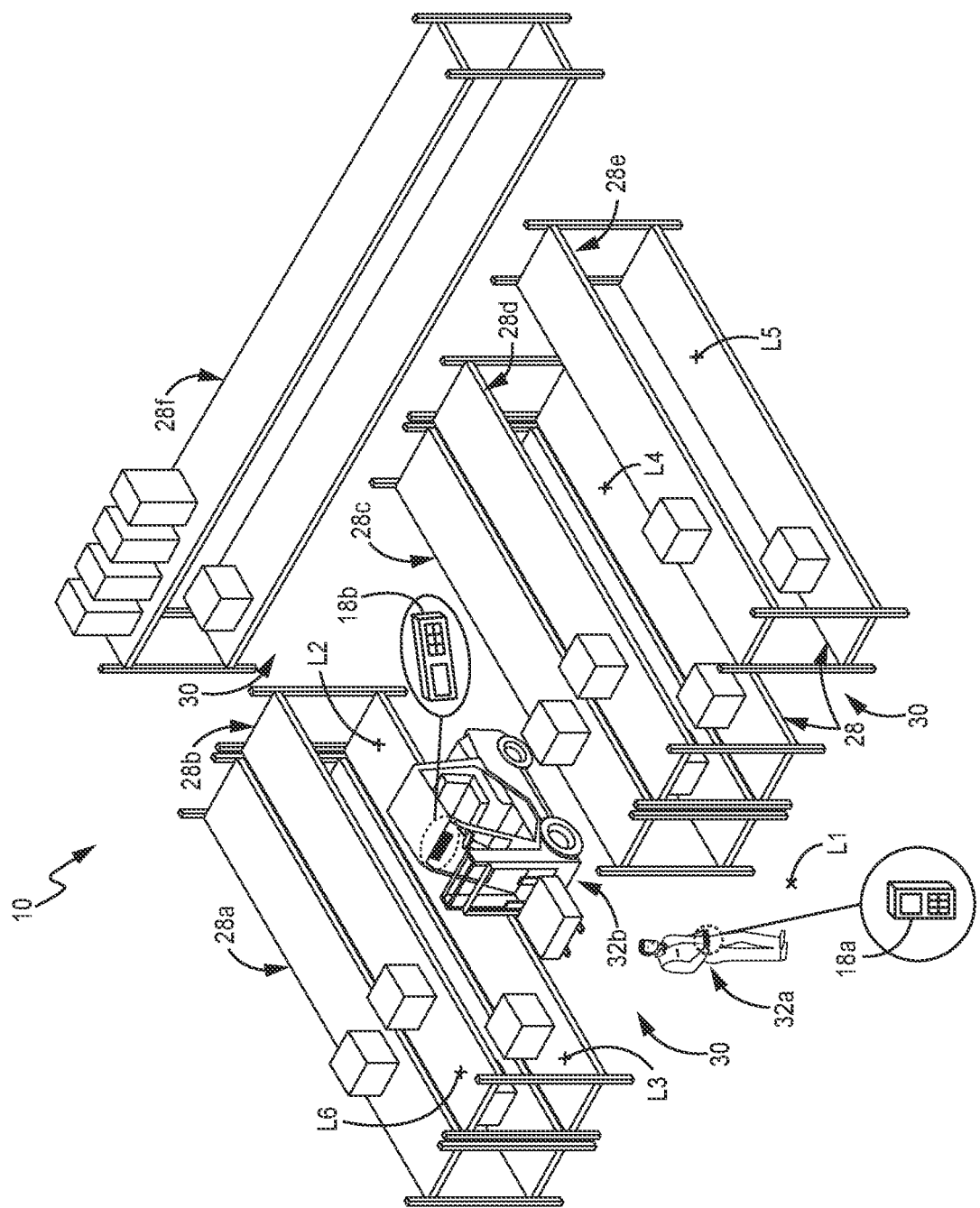
FIG. 1A is an isometric view of a physical system.
Figure 1B:
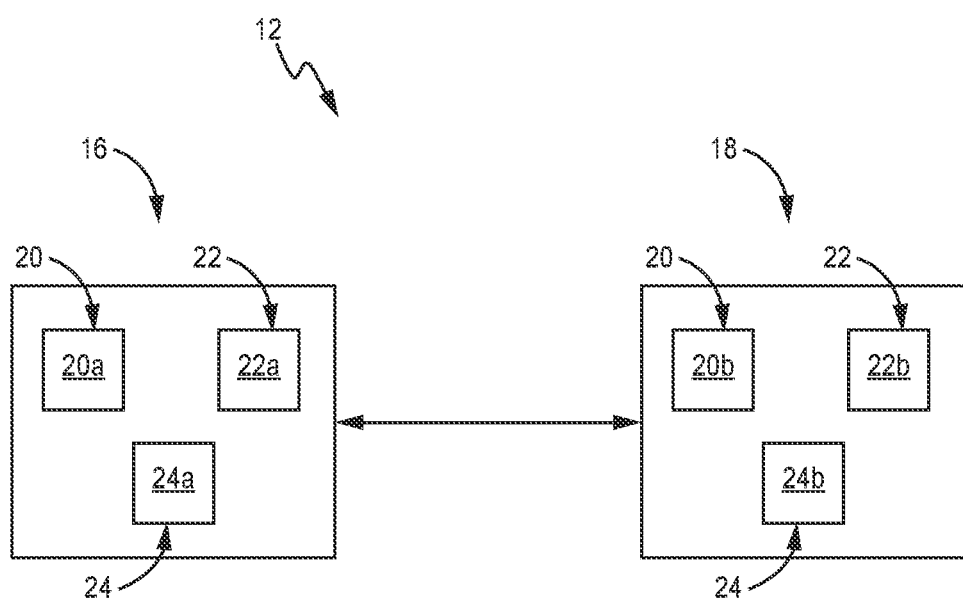
FIG. 1B is a schematic block diagram of a pathway system.
Figure 1C:
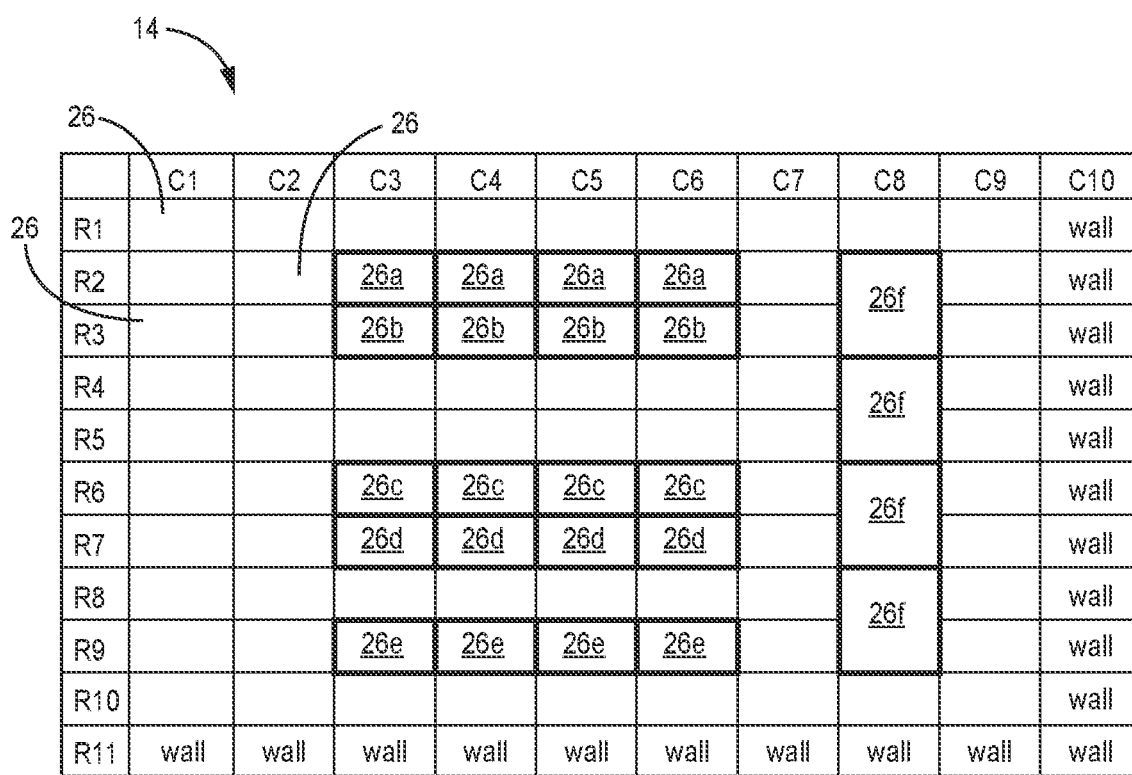
FIG. 1C is a plan view of a layout table.

FIG. 1A is an isometric view of physical system 10. FIG. 1B is a schematic block diagram of system modeler 12. FIG. 1C is a plan view of layout table 14. System modeler 12 includes layout module 16 and navigation module 18. Layout module 16 includes control circuitry 20*a*, memory 22*a*, and user interface 24*a*. Navigation module 18 includes control circuitry 20*b*, memory 22*b*, and user interface 24*b*. Layout table 14 includes cells 26. Control circuitry 20*a* and control circuitry 20*b* are referred to collectively herein as "control circuitry 20." Memory 22*a* and memory 22*b* are referred to collectively herein as "memory 22." User interface 24*a* and user interface 24*b* are referred to collectively herein as "user interface 24." FIGS. 1A-1C are discussed together.

Physical system 10 includes one or more bounded areas that can be represented by cells 26 overlaid on the area. For example, physical system 10 can be a warehouse, factory, school, hospital, neighborhood, store, office building, city, emergency response routing, etc. Physical system 10 is formed by reference locations that can be defined based on the nature of the reference location. For example, each reference location can be associated with products in a warehouse, assembly lines in a factory, operating rooms in a hospital, streets in a city, shelving units in a warehouse, among other options. The reference locations can be real locations within physical system 10.

In the example shown, physical system 10 is a warehouse that includes units 28 arranged within the warehouse forming physical system 10. Units 28 are shelving units that can store various items. Units 28 are arranged into two vertical levels stacked together. Pathways 30 form travel paths between units 28. Users, such as forklift 32b and operator 32a, can travel along the pathways 30 between units 28 and to locations within physical system 10, such as to retrieve an item from one of units 28.

System modeler 12 is configured to generate path data regarding various travel paths between the reference locations within physical system 10. System modeler 12 is further configured to generate shortest path information between the reference locations within physical system 10. System modeler 12 can provide the shortest path information to the user to facilitate navigation along pathways 30 within the bounded area. While system modeler 12 is shown as including layout module 16 and navigation module 18 as discrete assemblies, it is understood that layout module 16 and navigation module 18 together form the computing device of system modeler 12 and can be formed together in a common assembly.

System modeler 12 is configured to store software, implement functionality, and/or process instructions. System modeler 12 is configured to generate travel path information based on one or more layout tables 14. Layout table 14 is a cell-based representation of physical system 10, which can be graphically represented in a spreadsheet or other cell-based application. Each layout table 14 is formed by cells 26 that have respective cell locations within layout table 14. For example, the cell location can be the row and column of that cell 26. Each cell location is associated with a reference location of physical system 10. The content of cells 26 provides the rules that form the basis by which the travel data is generated.

In the example shown, system modeler 12 includes layout module 16 and navigation module 18. Layout module 16 and navigation module 18 can together define a computing device of system modeler 12. Layout module 16 is configured to generate the path data. Navigation module 18 configured to determine a shortest path based on the path data and provide shortest path information to the user. In some examples, layout module 16 can be a main computing device of system modeler 12 and navigation module 18 can be a remote computing device of system modeler 12.

Layout module 16 can be of any suitable configuration for gathering data, processing data, etc. Layout module 16 can receive inputs via user interface 24a, generate cell-based graphical representations of the layout tables 14, provide outputs to the user via user interface 24a, and generate travel path data. Layout module 16 can be of any type suitable for operating in accordance with the techniques described herein. Layout module 16 can be configured to store information regarding the layout tables 14 and to generate the path data based on one or more layout tables 14. The travel path data defines potential pathways between reference locations within physical system 10. For example, a path model can be generated based on layout tables 14.

Layout module 16 can include hardware, firmware, and/or stored software, and layout module 16 can be entirely or partially mounted on one or more circuit boards. Layout module 16 can be of any type suitable for operating in accordance with the techniques described herein. In some examples, layout module 16 can be implemented as a plurality of discrete circuitry subassemblies.

Navigation module 18 can be of any suitable configuration for gathering data, processing data, etc. Navigation module 18 can receive inputs via user interface 24b, provide outputs via user interface 24b, determine potential paths between reference locations based on the travel path information, determine shortest paths between reference locations based on the travel path data, and output shortest path information.

Navigation module 18 can include hardware, firmware, and/or stored software, and navigation module 18 can be entirely or partially mounted on one or more circuit boards. Navigation module 18 can be of any type suitable for operating in accordance with the techniques described herein. In some examples, navigation module 18 can be implemented as a plurality of discrete circuitry subassemblies. In some examples, navigation module 18 can include a smartphone or tablet, among other options.

While layout module 16 and navigation module 18 are shown as discrete assemblies, it is understood that layout module 16 and navigation module 18 can be formed by one or more devices capable of individually or collectively implementing functionalities and generating and outputting data as discussed herein. Layout module 16 and navigation module 18 are configured to, individually or collectively, perform any of the functions discussed herein, including receiving an output from any source referenced herein, detecting any condition or event referenced herein, and generating and providing data and information as referenced herein.

Control circuitry 20, in one example, is configured to implement functionality and/or process instructions. For example, control circuitry 20 can be capable of processing instructions stored in memory 22. Examples of control circuitry 20 can include one or more of a processor, a microprocessor, a controller, a digital signal processor (DSP), an application specific integrated circuit (ASIC), a field-programmable gate array (FPGA), or other equivalent discrete or integrated logic circuitry.

Layout module 16 and navigation module 18 can be directly or indirectly communicatively connected. In some examples, control circuitry 20 can include communications circuitry configured to facilitate wired or wireless communications. For example, the communications circuitry can facilitate radio frequency communications and/or can facilitate communications over a network, such as a local area network, wide area network, cellular network, and/or the Internet.

In some examples, one or both of layout module 16 and navigation module 18 can be configured to wirelessly communicate by radiofrequency communications. For example, one or both of layout module 16 and navigation module 18 can communicate utilizing short-wavelength ultra high frequency (UHF) radio waves in the 2.4 GHz band (2.400-2.525 GHz) (e.g., Bluetooth® communications). In another example, the communications circuitry can be configured for communications utilizing super high frequency (SHF) radio waves in the 5 GHz band. It is understood, however, that layout module 16 and navigation module 18 can be configured to communicate in any desired manner utilizing any suitable frequency.

In some examples, control circuitry 20 can include circuitry configured to generate location information regarding one or both of navigation module 18 and layout module 16. The location information can be data from GPS (Global Positioning System), GNSS (Global Navigation Satellite System), GPS/RTK (GPS/Real Time Kinematic), or equivalent systems, among other options. For example, navigation module 18 can be configured to dynamically update the user's location along the path based on the actual location of navigation module 18 within physical system 10.

Navigation module 18 can be configured to dynamically update the information provided to the user via user interface 24b as the user moves within physical system 10. For example, navigation module 18 can indicate a location of the user within physical system 10 by an icon displayed on user interface 24b. In some examples, navigation module 18 is configured to continuously generate and update the shortest path information as the user moves within the bounded area. Navigation module 18 can update the graphical location of the icon to correspond to the actual location of the user as the user moves within the bounded area. In some examples, navigation module 18 can determine and display updated shortest path information based on the user deviating from the indicted path.

Memory 22 can be configured to store information before, during, and/or after operation. Memory 22, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 22 is a temporary memory, meaning that a primary purpose of memory 22 is not long-term storage. Memory 22, in some examples, is described as volatile memory, meaning that memory 22 does not maintain stored contents when power to layout module 16 or navigation module 18 is turned off. Examples of volatile memories can include random access memories (RAM), dynamic random access memories (DRAM), static random access memories (SRAM), and other forms of volatile memories. In some examples, memory 22 is used to store program instructions for execution by control circuitry 20. Memory 22, in one example, is used by software or applications running on layout module 16 to temporarily store information during program execution.

Memory 22, in some examples, also includes one or more computer-readable storage media. Memory 22 can be configured to store larger amounts of information than volatile memory. Memory 22 can further be configured for long-term storage of information. In some examples, memory 22 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 24 can be configured as an input and/or output device. For example, user interface 24 can be configured to receive inputs from a data source and/or provide outputs regarding the bounded area and pathways therein. Examples of user interface 24 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users or machines.

In the example shown, the user can travel about physical system 10 along pathways 30. One or more layout tables 14 are generated to define physical system 10. The positions of units 28 are indicated by descriptors within cells 26 of layout table 14.

The user can insert or remove travel rules from layout tables 14 to define physical system 10 based on different configurations and operating conditions of system modeler 12. User interface 24 can provide a graphical representation of any one or more of layout tables 14 and the user can manipulate the individual cells 26 to insert or remove attribute descriptors from cells 26 via user interface 24.

System modeler 12 generates the path data based on the layout tables 14. System modeler 12 determines the shortest path based on the path data and provides the shortest path information to the user via user interface 24b. System modeler 12 facilitates user navigation within the bounded area.

Layout module 16 can generate the path data based on layout tables 14. Layout module 16 can recall the rules associated with each reference location from cells 26 of layout tables 14. Layout module 16 generates the travel data based on the travel rules associated with each cell location. For example, a directed graph, such as directed graph 36 (FIG. 4A), can be generated and defined based on layout table 14. Components of the directed graph (e.g., nodes and edges) are associated with the cell locations of layout table 14. Properties of the nodes and edges are defined based on the travel rules from the cell at the cell location associated with the node and/or edge. The nodes can represent what is located at the associated reference location within the physical system, such as a product, a switch, a fire station, a stop sign, etc. The edges represent potential pathways between the nodes. A pathway model, such as pathway model 42 (FIG. 4B), can be generated by layout module 16 based on the defined nodes and defined edges.

In some examples, the path data is generated by layout module 16 and provided to navigation module 18 to be stored in memory 22b of navigation module 18. Navigation module 18 generates shortest path information based on the path data. For example, an algorithm, such as Dijkstra's algorithm, can be applied to pathway model 42 (FIG. 4B) to generate the shortest path information between an origin location and a destination location. For example, navigation module 18 can generate a node count of the number of nodes along each potential path and generate the shortest path information based on the path having the lowest node count. In some examples, navigation module 18 can count the distance along each edge forming the path between the origin location and the destination location and/or count a number of edges between the origin location and the destination location to determine the shortest path.

The user can initiate route guidance via navigation module 18. For example, the user can have a task list that requires visiting several locations within physical system 10. The route can start at reference location L1 (FIG. 1A) and include stops at one of reference locations L2 or L4 and one of reference locations L3 or L5 before returning to reference location L1. Multiple pathways are possible between the various reference locations L1, L2 or L4, and L3 or L5. Each reference location is associated with a cell location of layout table 14 and defined by rules in the cell 26 at that cell location. In the example shown, reference location L1 is associated with the cell location at row R5, column C2; reference location L2 is associated with the cell location at row R3, column C6; reference location L3 is associated with the cell location at row R3, column C3; reference location L4 is associated with the cell location at row R7, column C5; reference location C2 is associated with the cell location at row R9, column C5.

Cells 26 that are associated with locations L2-L5 are occupied and indicate occupied locations within physical system 10. Unit 28a occupies cells 26a at row R2, columns C3-C6; unit 28b occupies cells 26b at row R3, columns C3-C6; unit 28c occupies cells 26c at row R6, columns C3-C6; unit 28d occupies cells 26d at row R7, columns C3-C6; unit 28e occupies cells 26e at row R9, columns C3-C6; and unit 28f occupies cells 26f at column C8, rows R2-R9. Layout table 14 can be graphically displayed by user interface 24. Occupied ones of cells 26 can be visually distinguished from unoccupied ones of cells 26 to visually identify the locations of the boundaries of the travel area and the locations of objects within the travel area.

The user can input travel stops via user interface 24b. For example, the user can input destinations along the route. Navigation module 18 determines a shortest path among the possible pathways connecting each of the destinations. Navigation module 18 can output the shortest path information via user interface 24b and guide the user along the shortest path and to the various reference locations. In some examples, navigation module 18 can initiate and provide route guidance based on the location data regarding navigation module 18.

In some examples, the user can input multiple destination locations for a given route. The order in which the destination locations are visited can be definite (e.g., supplied by the user) or indefinite (e.g., determined by system modeler 12). For example, the user can indicate that the location L2 or L4 is a first stop and that the location L3 or L5 is the second stop along the route. System modeler 12 generates the shortest route data based on the specified travel order.

System modeler 12 can further generate travel path data, define travel areas, and generate shortest path information for three dimensional systems, such as physical system 10 including vertical layers of shelving. For example, one or more layout tables 14 can define each vertical layer of the three-dimensional system. The path models for each layer can be linked together to fully define physical system 10.

In the example shown, a first set of one or more layout tables 14 can define the lower vertical layer of physical system 10 that includes the lower shelves of units 28. A second set of one or more layout tables 14 can define the upper vertical layer of physical system 10 that includes the upper shelves of units 28. The shortest path information can be generated based the path data that is generated based on both the first set of layout tables 14 and the second set of layout tables 14. For example, layout module 16 can determine, based on the path data, that a first target item is located at location L3, which is on lower shelf of unit 28a, and that a second target item is located at location L2 on the lower shelf of unit 28a. System modeler 12 can determine, based on the path data, that the second target item is also located at location L6, which is vertically aligned with location L3 but on the upper shelf of unit 28a. In such an example, navigation module 18 can navigate the user to the portion of the pathway 30 that has access to both location L3 and location L6 to retrieve both the first and second target items.

System modeler 12 can output the shortest path information in any desired manner. For example, user interface 24 can provide a visual and/or audio output regarding the current path. Navigation module 18 can display the full travel path or a portion of the travel path. For example, navigation module 18 can display the full travel path from location L1 to L2 to L3 and back to L1 via user interface 24. In some examples, navigation module 18 can display a first path from location L1 to location L2. Navigation module 18 can display a second path from location L2 to location L3 based on the user reaching or approaching location L2. In some examples, navigation module 18 can automatically display all or some of the second path based on the actual location of navigation module 18 being within a threshold distance of location L2. For example, navigation module 18 can determine its location within physical system 10 based on the location data generated by navigation module 18. In some examples, navigation module 18 can prompt the user to indicate when the user reaches the next destination to cause navigation module 18 to display the next path.

System modeler 12 further facilitates coordinated travel between multiple concurrent users within physical system 10. In the example shown, a first navigation module 18a is a handheld associated with operator 32a and a second navigation module 18b is associated with forklift 32b. The first navigation module 18a can be operatively associated with the second navigation module 18b such that system modeler 12 generates the shortest path information based on the pathways and locations associated with other users. For example, the location data regarding second navigation module 18b can indicate that second navigation module 18b is at a certain reference location within physical system 10. First navigation module 18a can be configured to generate shortest paths that avoid the location of second navigation module 18b such that both navigation modules 18a, 18b are not occupying the same location at the same time.

In some examples, first navigation module 18a is configured to generate shortest path information based on the travel path data and reference data regarding the anticipated travel path associated with second navigation module 18b. For example, the current path of second navigation module 18b can form the reference data. The shortest path data associated with second navigation module 18b can indicate the anticipated travel path of forklift 32b. First navigation module 18a can receive the shortest path information from second navigation module 18b and determine the shortest path for operator 32a based on the reference data. For example, the shortest path information can be generated to prevent first navigation module 18a and second navigation module 18b coinciding at the same location within physical system 10. In some examples, navigation modules 18 have a right-of-way parameter associated therewith. For example, second navigation module 18b, which is associated with forklift 32b, can have a higher priority right-of-way parameter than first navigation module 18a, which is associated with operator 32a. Navigation modules 18a, 18b with the lower priority can be configured to update the shortest path information based on an anticipated overlap of operator 32a and forklift 32b at a common location, while navigation modules 18a, 18b with the higher priority can be configured to continue outputting the current shortest path.

System modeler 12 provides significant advantages. System modeler 12 generates travel path data based on one or more layout tables 14 associated with physical system 10. The layout tables 14 provide operating rules that define features of physical system 10. Shortest paths between reference locations are generated based on the travel path data. System modeler 12 can provide shortest path information to facilitate efficient travel within physical system 10.

System modeler 12 provides an efficient, understandable, intuitive system for dynamically generating, modifying, and providing shortest path information regarding travel within a physical system.

Figure 2A:
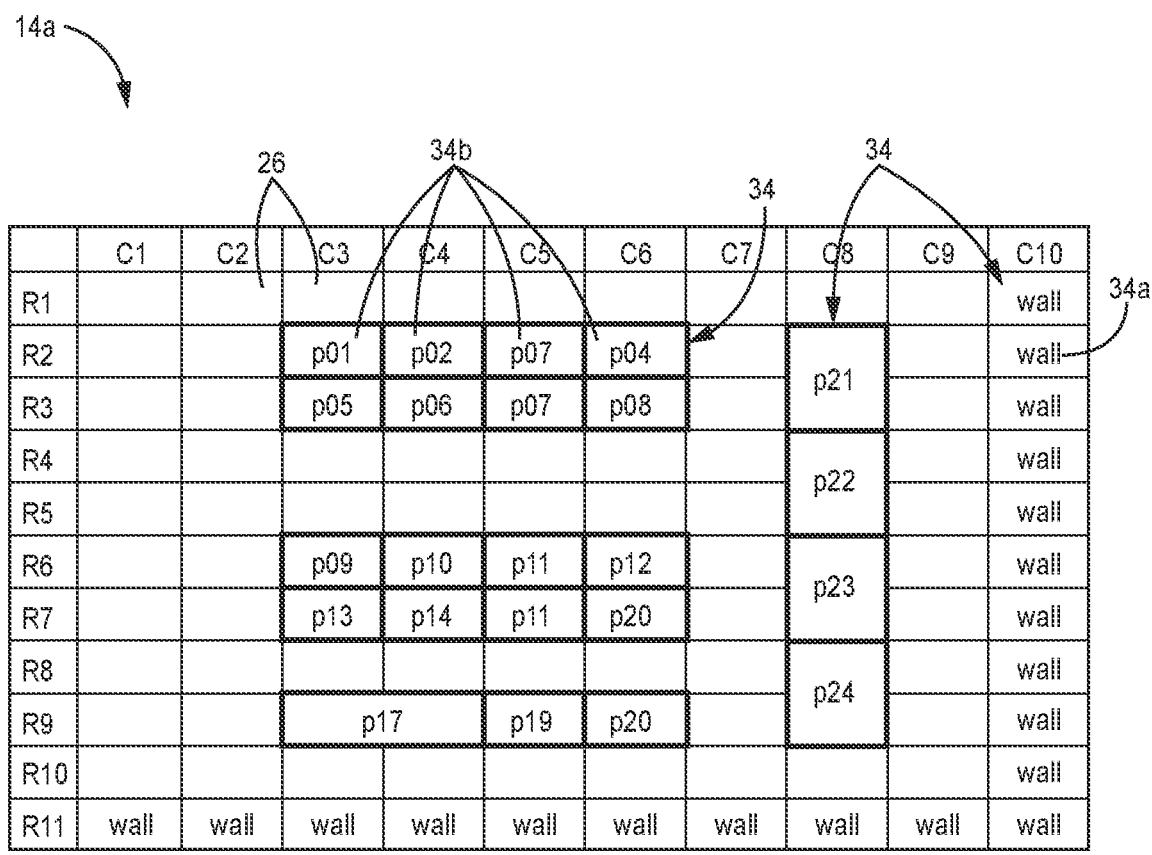
FIG. 2A is a plan view of a layout table.
Figure 2D:
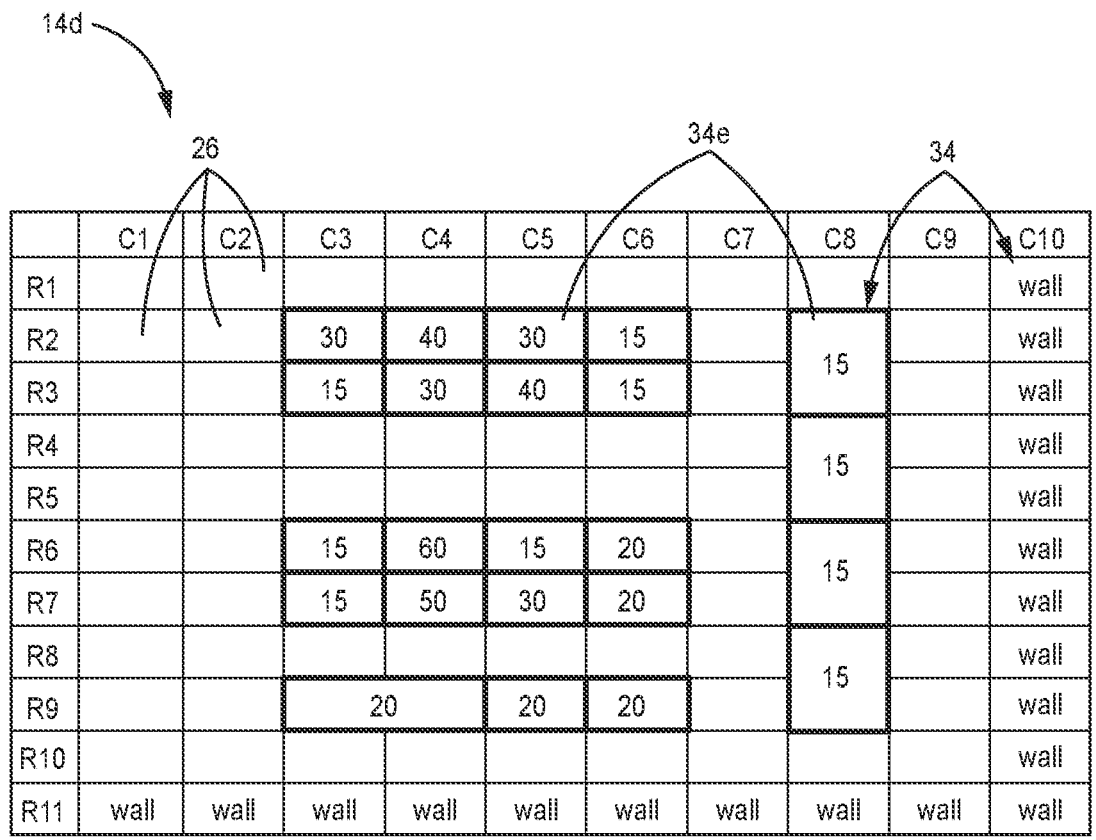
FIG. 2D is a plan view of a layout table.

FIG. 2A is a plan view of layout table 14*a* including cells 26, attribute descriptors 34*a*, and attribute descriptors 34*b*. FIG. 2B is a plan view of layout table 14*b* including cells 26 and attribute descriptors 34*c*. FIG. 2C is a plan view of layout table 14*c* including cells 26 and attribute descriptors 34*d*. FIG. 2D is a plan view of layout table 14*d* including cells 26 and attribute descriptors 34*e*. Layout table 14*a*, layout table 14*b*, layout table 14*c*, layout table 14*d*, and layout table 14*e* are referred to collectively herein as "layout table 14" or "layout tables 14." Attribute descriptors 34*a*-34*d* are referred to collectively herein as "attribute descriptors 34" or "attribute descriptor 34." FIGS. 2A-2D are discussed together.

Layout tables 14 are cell-based representations of a physical system, such as a house, factory, office building, hospital, transportation network, school, city, etc. In the example shown, layout tables 14 are cell-based representations of physical system 10 (FIG. 1A). Each layout table 14 is formed by cells 26 arranged in rows R and columns C. In the example discussed, each of layout tables 14*a*-14*d* include rows R1-R11 and columns C1-C10.

Layout tables 14 provide rules that define features at each reference location within physical system 10 and define travel relative to each reference location within physical system 10. The operating properties can be associated with movement and access within the physical space. For example, the rules can specify one-way travel, implement speed limits, provide time delays, limit access, or indicate characteristics of various objects, such as shelving units, conveyor lines, display racks, trees, sidewalks, offices, buildings, classrooms, etc., regarding the reference location. In the example shown, cells 26 are rectangular cells that each have up to four directly adjacent cells 26 and up to four diagonally adjacent cells 26. It is understood, however, that cells 26 of layout tables 14 can take any desired configuration. For example, layout tables 14 can include hexagonal cells such that each cell can have up to six directly adjacent cells.

Each cell 26 has a cell location associated with a reference location in physical system 10. For example, each cell 26 can be associated with a 3'×3' location within the physical system, among other options. Cells 26 can be merged (such as the cell 26 at rows R1-R2, column C8) to increase the representative size of the cell 26 or can be split to decrease the representative size of the cell 26.

Figure 4A:
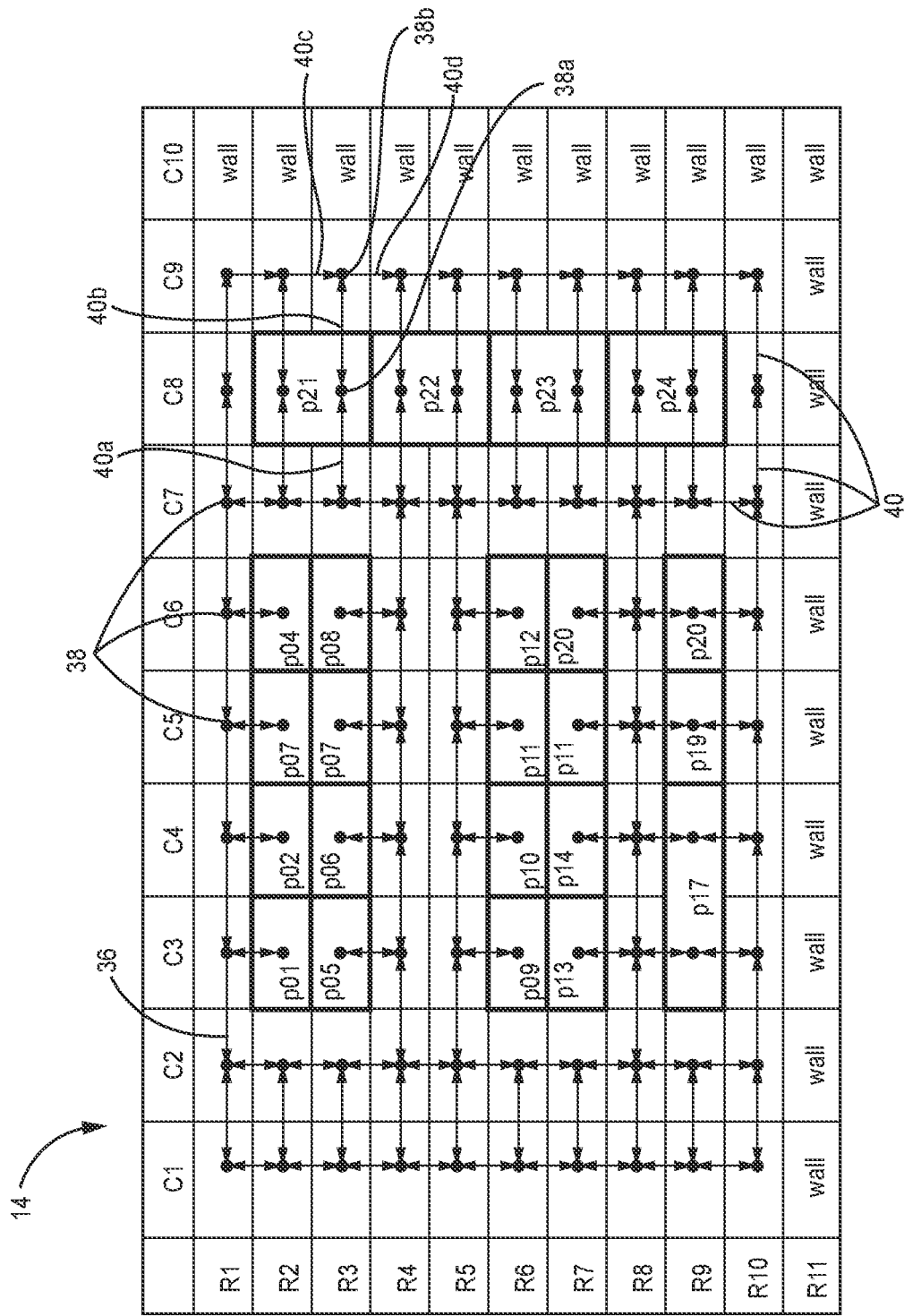
FIG. 4A is a plan view of a directed graph overlaid on the layout table of FIG. 2A.

Layout tables 14 provide rules that define properties of the reference locations associated with the cell 26. The rules are defined by attribute descriptors 34 that are disposed within subsets of cells 26. Attribute descriptors 34 are recalled from cells 26, by system modeler 12 (FIG. 1B). Attribute descriptors 34 provide the rules that are applied to associated components (e.g., nodes and edges) of a directed graph, such as directed graph 36 (FIG. 4A). The rules define the properties of the nodes and edges. A pathway model, such as pathway model 42 (FIG. 4B) is generated based on the defined properties.

Each cell 26 has a cell location within layout table 14. Each cell location is associated with a reference location within physical system 10. The cell locations uniquely identify each respective cell 26 as associated with the reference location and relative to other cells 26. The cell location can be referred to as a cell site, cell position, table position, etc. In some examples, each cell location has a table address associated with the cell location. The table address can be inserted into cells 26 to link the various cells 26 to the cell location indicated by the table address. It is understood that the table address can take any form and can link cells 26 not disposed at the same row R and column C together to define the reference locations. Cells 26 having the same table address are associated together such that those cells have the same cell location and are considered coincident with each other. The table addresses can link cells 26 of component layout tables 14 to common cell locations to fully define properties of the reference location based on the contents of cells 26 of the multiple component layout tables 14.

In layout tables 14, some of cells 26 are empty and some are occupied. In some examples, occupied ones of cells 26 are associated with objects within physical system 10 while unoccupied ones of cells 26 are associated with open locations within physical system 10. In the example shown, the cell locations of the occupied cells 26 are associated with the reference locations of units 28 (FIG. 1A) of physical system 10. Both occupied cells 26 and unoccupied cells 26 can be further defined by one or more additional rules.

Attribute descriptors 34 are located in cells 26 to define the reference locations associated with the locations of cells 26. For example, attribute descriptors 34 can be inserted into cells 26 to indicate the presence and characteristics of shelving units, conveyor lines, display racks, trees, sidewalks, offices, buildings, classrooms, etc. at the reference location within the bounded physical area.

Attribute descriptors 34 provide the rules regarding travel and access relative to the reference locations within physical system 10. Such information facilitates determining the shortest path based on one or both of target objects (e.g., a particular item) and target locations. Various rules from the one or more layout tables 14 are taken together to generate the travel path data. Each attribute descriptor 34 can provide one or more rules to define travel relative to the cell locations associated with the attribute descriptor 34, thus defining travel relative to the reference location associated with that cell location.

Attribute descriptors 34 can be retrieved from cells 26 of multiple ones of layout tables 14 to generate the path data. In some examples, each layout table 14 can be associated with different types of attribute descriptors 34. For example, a first layout table 14 can be associated with speed limits, a second layout table 14 can be associated with directional travel, etc. Attribute descriptors 34 from the various layout tables 14 can be layered together based on a common cell location to fully define travel and access relative to that cell location.

In some examples, attribute descriptors 34 provide default rules for the associated cell location. The default rules can specify, for example, unrestricted access to and unrestricted travel relative to the cell location, among other options. For example, an empty or unfilled condition of a cell 26 (e.g., the cell 26 at column C1, row R1 in layout table 14*a*) is an attribute descriptor 34 that does not modify the attributes of that cell location. In some examples, each cell location is initially associated with the default rule such that each cell location has a base configuration. The base configuration can be modified based on additional attribute descriptors 34 recalled from other ones of layout tables 14.

System modeler 12 can include a rules library stored in memory 22 (FIG. 1A). The rules provided by each attribute descriptor 34 can be defined by the rules library. The rules library can provide the one or more rules associated with the selected attribute descriptor 34. For example, an attribute descriptor 34 of a select cell 26 can be graphically represented by "N" to indicate that the select cell 26 is accessible only from the cell location of the cell 26 directly adjacent to and above the select cell 26. For example, the cell 26 at row R2, column C3 in layout table 14*b* includes "N" because the reference location associated with that cell 26 is accessible only from the reference location associated with the cell 26 at row R1, column C3. System modeler 12 recalls the attribute descriptor 34 from the selected cell 26 and references the rules library to determine the configuration of components of directed graph 36 associated with the cell location of the selected cell 26.

For example, a single attribute descriptor 34 can define the presence of a storage bin at a reference location. The rules associated with that attribute descriptor 34 can indicate the type of item within the bin, whether the bin is traversable, the time required to access the bin, etc. The rules library can provide the particular rules associated with the attribute descriptor 34. Such an attribute descriptor 34 allows the user to graphically insert properties of objects into select locations within layout tables 14 without having to fully redefine each property of the object as associated with that location.

By way of example, layout tables 14*a*-14*d* defining physical system 10 are discussed in more detail. The locations of the objects within the bounded area represented by layout table 14 and the boundaries of the area are defined. As shown in FIG. 2A, attribute descriptor 34*a* is applied to the subset of the cells 26 of layout table 14*a* defining boundaries of the defined area of physical system 10. Attribute descriptor 34*a* is applied to the cells 26 in row R11, columns C1-C10 to designate those cells 26 as boundary cells. Attribute descriptor 34*a* is also applied to the cells 26*a* in column C10, rows R1-R10. Attribute descriptor 34*a* is a boundary indicator that identifies and defines the boundary of the area.

While the first attribute descriptor 34 is shown as "wall" it is understood that the boundary indicator can take any desired form for designating the subset of cells 26 having attribute descriptor 34*a* as boundary cells. Moreover, boundary indicators can be associated with any desired location within the physical system. For example, boundary indicators can be generated to subdivide an open floor into various bounded areas to more easily define each bounded area based on an associated set of layout tables 14. Boundary ones of attribute descriptors 34 can take different forms and provide different operating properties. In the example shown, the upper and left bounds of layout table 14 are also considered boundaries as no additional cells lie in those directions. It is understood, however, that the boundary can be fully defined by applying boundary ones of attribute descriptors 34 to cells 26 such that the active area of layout table 14 is fully circumscribed by cells 26 having boundary ones of attribute descriptors 34*a*.

Some examples of boundary rules, such as those associated with walls, configure the path data such that travel paths cannot extend into or cross the subset of cells 26 defined by the boundary rule. In some examples, the nodes of directed graph 36 are not associated with cells having the boundary indicator but are instead associated with only those cells 26 within the area bounded by the boundary cells. It is understood, however, that in some examples, boundary ones of attribute descriptors 34 can be a transfer indicator that can both define a boundary of the bounded area and be associated with pathways.

Transfer indicators define a cell location as associated with a different set of layout tables 14 defining a different bounded area. Transfer indicators can link pathway models for different bounded areas together to define a larger physical system. For example, the transfer indicator can be associated with a stairwell, elevator, escalator, etc. A first transfer indicator in layout tables 14 of a first table set defining a first bounded area of the overall physical system can be associated with a second transfer indicator in layout tables 14 of a second table set that defines a second bounded area of the overall physical system. Various bounded areas can thereby be linked by the transfer indicators to generate an overall system wide path model.

Transfer indicators facilitate system modeler 12 generating path data for three dimensional physical systems. For example, the first table set can be associated with a first floor of an office building and the second table set can be associated with a second floor of the office building. Each table set is associated with and defines a vertical layer of physical system 10. System modeler 12 can generate pathways for the first floor based on the first table set and can generate pathways for the second floor based on the second table set. The pathways from the multiple layers can be linked together by the transfer indicators to generate pathways throughout each vertical layer of physical system 10. Layout tables 14 thereby facilitate modeling of three dimensional systems and generating path data and shortest path information within three dimensional systems.

The locations of objects within physical system 10 are indicated by applying one or more attribute descriptors 34 to relevant ones of cells 26. In the example shown, some cells 26 within the bounded area are filled and some are empty. Attribute descriptors 34*b* identify the associated cell locations as occupied and can provide additional information regarding the occupant of that cell location. In the example shown, attribute descriptors 34*b* provide the locations of units 28 within physical system 10. Attribute descriptor 34*b* further defines the items disposed at the location associated with the occupied ones of cells 26. For example, the cell 26 at row R2, column C3 is associated with item p01 and the cell 26 at row R6, column C5 is associated with item p11.

Layout table 14*a* indicates the base arrangement of physical system 10. Additional operating rules and properties can be inserted into cells 26 to further define physical system 10. In some examples, the base arrangement can be graphically represented on additional ones of layout tables 14 to facilitate insertion of attribute descriptors 34 into cells 26 by the user. For example, the locations of units 28 and the boundary are graphically represented on each of layout tables 14*a*-14*d*. Such passthrough identifiers visually distinguish to the user those cells 26 that are occupied and cells 26 that are unoccupied. For example, the passthrough identifiers can be visually output to the user, such as via a user interface 24, at cells 26 having common cell locations in each layout table 14. For example, the passthrough identifier can be a visual identifier, such as a color, shading, fill pattern, character, etc. that visually distinguishes occupied cells 26 from unoccupied cells 26.

The operating rules can define access to the cell locations. In FIG. 2B, attribute descriptor 34*c* is located in a subset of cells 26 of layout table 14*b* associated with reference locations occupied by units 28. Attribute descriptor 34*c* further defines access to those units 28. Attribute descriptor 34*c* defines the directions from which the subset of cells 26 including attribute descriptor 34*c* can be accessed.

In the example shown, attribute descriptor 34*c* positively defines access to the associated reference location. For example, attribute descriptor 34*c* for the cell 26 at row R2, column C5 is "N." The positive rule indicator "N" defines the cell location of that cell 26 as being accessible only by a path extending from the cell location of the cell 26 directly adjacent to and above that defined cell 26. As such, attribute descriptor 34c limits access to the cell 26 at row R2, column C5 to being from the cell 26 at row R1, column C5. It is understood that, while descriptors are discussed relative to cardinal directions, the attribute descriptors 34 are relative indicators that can be disassociated from true compass directions. For example, "W" can indicate to the relative west or left of the cell 26 being defined, while "E" can indicate to the relative east or right of the cell 26 being defined.

While attribute descriptor 34c is described as positively defining access, it is understood that attribute descriptors 34 can define paths either positively or negatively. For example, attribute descriptor 34c can be a negative descriptor that defines restrictions on travel rather than allowable travel. For example, a negative attribute descriptor 34 for the cell 26 at row R2, column C5 could read "WSE" to define access as prevented from the cells 26 disposed directly to the left, right, and below the defined cell 26.

Attribute descriptors 34 can define properties of travel paths along the pathways 30 (FIG. 1A). In FIG. 2C, attribute descriptor 34d is located in a subset of cells 26 of layout table 14d to define the directionality of travel allowed through that subset of cells 26. Attribute descriptor 34d indicates the defined direction of travel for traffic relative to the cell location associated with attribute descriptor 34d.

For example, attribute descriptor 34d in the cell 26 at row R2, column C9 is "NS." In the example shown, the attribute descriptor 34d positively defines the directionality along which travel is allowed (e.g., "NS" indicates that travel is allowed from north towards the south (up to down)). As such, travel paths will not be formed from the cell 26 at column C9, row R10 to the cell 26 at column C9, row R1 through cells 26 in column C9, rows R2-R9. Similarly, the cells 26 at row R1, columns C3-C6 include the attribute descriptor 34 "EW" such that travel paths can extend east to west (e.g., right to left in the view shown) through those cell locations while preventing opposite travel from left to right. Cells 26 at row R10, columns C3-C6 include the attribute descriptor 34 "WE" such that travel paths can extend west to east (e.g., left to right in the view shown) through those cell locations.

Attribute descriptors 34 can define temporal properties associated with the reference locations. For example, the temporal property can be associated with cells 26 to define a task delay associated with a cell 26, such as the amount of time anticipated for completing a task at the reference location associated with the defined cell 26. For example, the temporal delay can be the time to pick up or drop off an item, the typical time for a stop light/sign, or the time required to perform a task, among other options. In some examples, the temporal properties can be associated with the time required to travel within and/or through a cell location. For example, temporal properties can be associated with a moving walkway to define the time required for the walkway to traverse between cell locations.

As shown in FIG. 2D, a temporal attribute descriptor 34e is located in a subset of cells 26 of layout table 14d to provide temporal properties to that subset of cells 26. In this example, the temporal rule provides a dwell time associated with accessing the subset of cells 26. For example, the temporal delay indicated by the attribute descriptor 34e can be the length of time required to pick up or drop off product at the locations associated with the subset of cells 26. In the example shown, attribute descriptor 34e for the cell 26 at row R3, column C4 is "30." The temporal rule can define the length of time associated with picking up or dropping off item p06 at that cell 26. In some examples, the temporal attribute can be associated with a task being completed at the location being accessed. The temporal attribute can be a period of time for each item being picked up or dropped off at the location associated with the cell. For example, the dwell time can be twenty seconds per item being picked up or dropped off. In some examples, the dwell time can vary based on a threshold number of items. For example, a first time period can utilized when the number of items is less than the threshold and a second time period can be utilized when the number of items is greater than the threshold.

In some examples, the dwell time can be based on the nature of the dweller, which is the one accessing the location. For example, the dwell time can be a first time period if the accessor is a vehicle, such as forklift 32b (FIG. 1A), while the dwell time can be a second time period if the accessor is an operator, such as operator 32a (FIG. 1A). The first and second time periods can differ. In some examples, a first layout table can include dwell times associated with vehicles while a second layout table can include dwell times associated with operators.

It is understood that attribute descriptors 34 and associated rule properties are discussed herein by way of example. The path data can be generated based on any desired number of attribute descriptors 34 and rules that are provided by any desired number of layout tables 14. Attribute descriptors 34 can take any desired form for conveying the rules associated with that attribute descriptor 34.

Attribute descriptors 34 can be applied to the layout tables 14 by the user via user interface 24, for example. Cells 26 of various ones of the layout tables 14 can be linked together based on cell location such that copying the content of one of the linked cells can copy all properties associated with that linked cell. For example, the content of the cell 26 at row R2, column C4 can be copied and applied to a new cell location. That new cell location can be defined by the same rules as the copied cell. In this example, that new cell location can include operating parameters defining that cell location as occupied (FIG. 2A), accessible from the direction adjacent the cell location to the relative north (FIG. 2B), having a dwell time based on "40" (FIG. 2C). It is understood that each layout table 14 is individually editable within that layout table 14 without altering the content of the other layout tables 14.

Layout tables 14 together define the nature of each of the reference locations within the bounded area of physical system 10. Attribute descriptors 34 from cells 26 having the same cell location are layered together to define each reference location. In some examples, layout tables 14 can be activated or deactivated to generate various potential pathways. For example, a first path model can be generated based on each of component layout tables 14a-14d being active such that each component layout table 14a-14d provides additional definition to the paths. Additional path models can be generated based on a first subset of one or more of the layout tables 14a-14d being activated while a second subset of one or more of the layout tables 14a-14d is deactivated. For example, layout table 14c can be deactivated such that travel is not directionally restricted by attribute descriptors 34d. A second pathway model can be generated based on the updated configuration provided by the active layout tables 14.

Layout tables 14 provide significant advantages. The bounded area is defined by one or more layout tables 14 that together fully define the operating properties at each reference location within the bounded area. Layout tables 14 facilitate quick and efficient manipulation of aspects regarding each reference location and of the bounded area itself to generate multiple path models for a complex physical system. Multiple, complex properties can be applied to a single location or object within the physical system by combinations of attribute descriptors 34 located within cells 26 of the layout tables 14. Cells 26 from various layout tables 14 are associated together based on the cell locations. Building complex rule sets and properties across multiple layout tables 14 simplifies the modeling and path generation process.

Layout tables 14 facilitate generating path models based on the current configuration of physical system 10 and potential configurations of physical system 10. Layout tables 14 can be activated and deactivated to facilitate the generation of different path models and allow for efficient modeling and simulations based on various arrangements of physical system 10. In addition, cells 26 within each layout table 14 can be manipulated to apply or remove certain properties from reference locations, facilitating efficient generation of additional variations of the physical system being modeled. The user can manipulate the content of individual cells 26 within the layout tables 14 via user interface 24.

Layout tables 14 facilitate modeling of complex physical systems by defining subparts of the overall physical system. Layout tables 14 provide a technology-based solution to modeling paths within complex systems and facilitates the quick and efficient generation of alternate path models. Layout tables 14 further facilitate determining shortest paths between locations within the complex physical system while providing the ability to manipulate features of the physical system to optimize desired routes within the various configurations of the complex physical system.

Layout tables 14 are cell-based tables that provide definition to the bounded area of the physical system. The partial definitions for each reference location provided by each layout table 14 are linked together to fully define the bounded area based on the operating rules from cells 26 that are each associated with the same reference location. A complex physical system can be defined by multiple table sets that are each defined by one or more layout tables 14. For example, a store can be defined by a first table set associated with the stock room, a second table set associated with the grocery section, a third table set associated with the sporting goods section, etc. Pathway models can be generated based on each table set and linked together to generate a full system model. Layout tables 14 forming each table set can be edited to facilitate modification within portions of the complex physical system.

Layout tables 14 further facilitate modeling of and navigation relative to vertical layers of a complex physical system. Pathway models for each vertical layer can be generated based on the table set for that layer. The various pathway models can be linked together, such as by transition descriptors, to generate a full system model. Layout tables 14 provides an efficient, understandable, intuitive system for dynamically defining paths within complex physical systems as well as for modifying and generating shortest path information to facilitate navigation within complex physical systems. System modeler 12 can generate new physical systems and modify existing physical systems by modifying layout tables 14.

Figure 3:
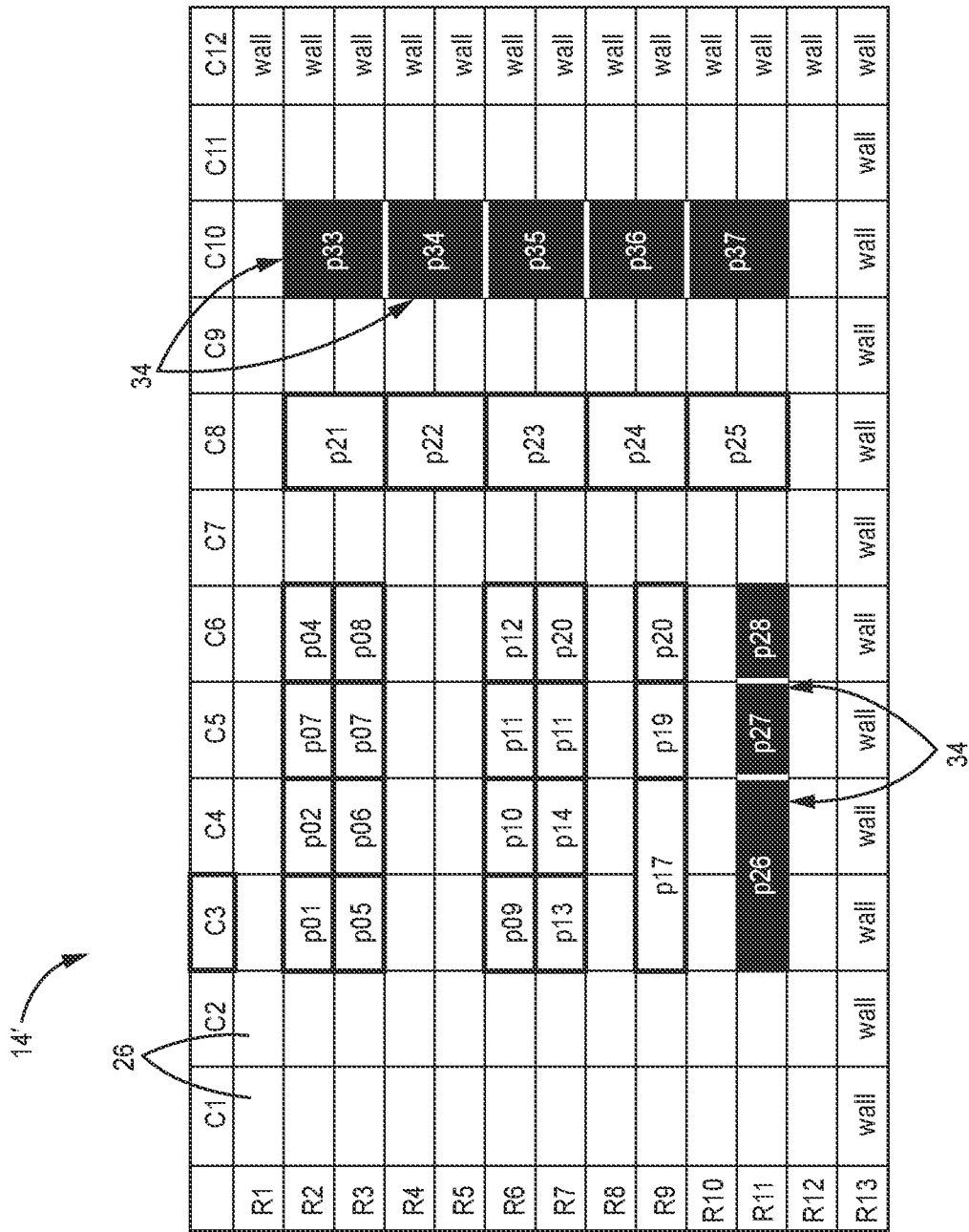
FIG. 3 is a plan view of a modified layout table.

FIG. 3 is a plan view of modified layout table 14'. Layout table 14' is substantially similar to layout tables 14 (FIGS. 2A-2D), except that layout table 14' includes a greater number of cells 26 arranged in additional rows and columns. Layout table 14' relates to an expanded bounded area relative to layout tables 14.

The locations and/or attributes of the boundaries, objects within physical system, pathways, etc. can be altered by editing the content within cells 26. In the example shown, additional rows and columns are added to expand the bounded area. The bounded area is expanded by shifting the boundary indicators to new positions such that additional rows R12 and R13 and additional columns C10 and C11 are within the travel area. While layout table 14' is shown as having an expanded bounded area relative layout tables 14 (FIGS. 1C-2D), it is understood that the layout table 14' can be contracted to reduce the bounded area.

In the example shown, additional attribute descriptors 34 are added to the cells 26 at row R11, columns C3-C6 of layout table 14' to define a unit, similar to units 28 (FIG. 1A) as being at the reference locations associated with those cell locations. A second additional unit, similar to units 28, is defined by attribute descriptors 34 inserted into cells 26 at rows R2-R11, column C10. Attribute descriptor 34 is added to cells 26 in column C8, rows R10-R11 to represent an expanded configuration of unit 28e (FIG. 1A).

Layout table 14' represents a potential configuration of physical system 10 (FIG. 1A). Path data can be generated based on one or more modified layout tables 14' to provide path data for various potential configurations within physical system 10. For example, potential configurations for an expansion to a facility can be generated by modified layout tables 14'. Path data can be generated to determine an optimized configuration for the expansion before any modifications are made to the physical system itself.

Figure 4B:
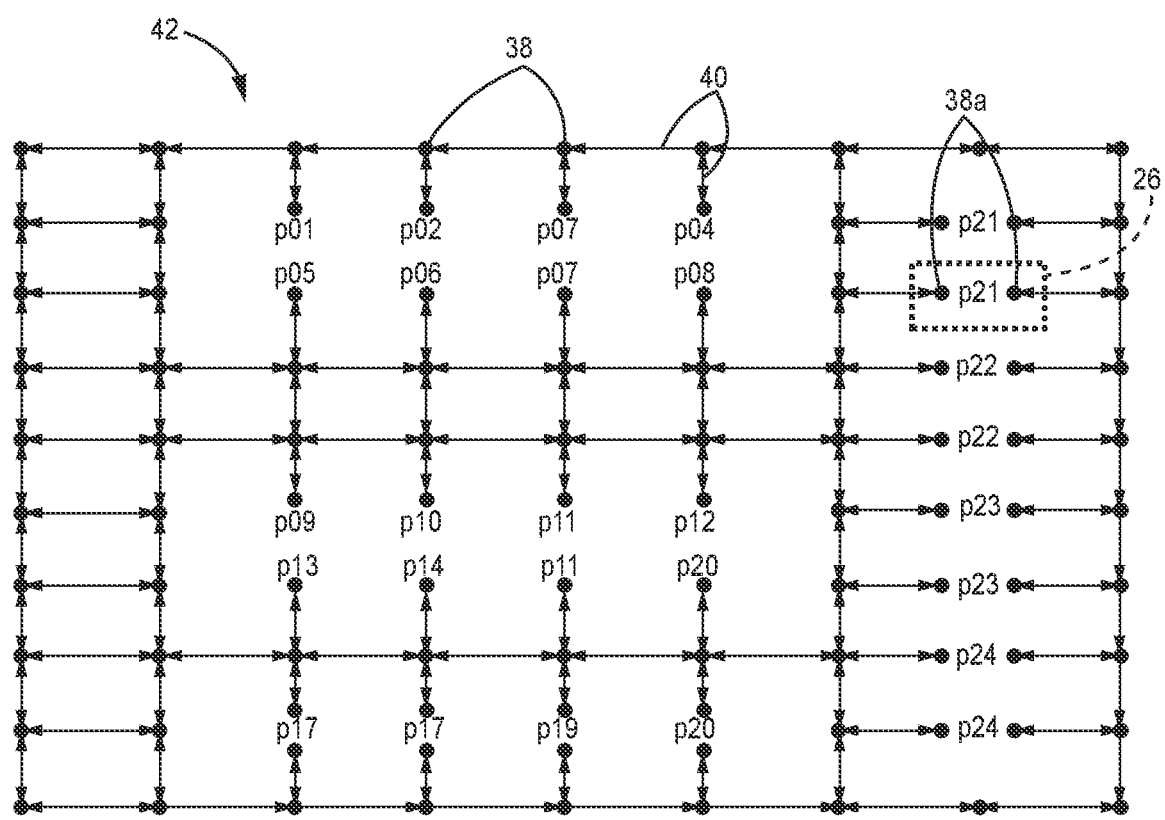
FIG. 4B is a schematic diagram of a pathway model.

FIG. 4A is a plan view showing directed graph 36 overlaid on layout table 14. FIG. 4B is a schematic diagraph of pathway model 42. FIGS. 4A and 4B will be discussed together.

Layout table 14 is representative of physical system 10 (FIG. 1A). Directed graph 36 is generated and defined based on rules from layout table 14. Each cell 26 is associated with a reference location in the bounded area represented by layout table 14.

Directed graph 36 is formed by nodes 38 and edges 40. The edges 40 can connect adjacent ones of the nodes 38. Nodes 38 are associated with cell locations to associate nodes 38 with reference locations within physical system 10. Edges 40 define paths between nodes 38. Nodes 38 and edges 40 are defined based on operating properties from one or more layout tables 14. Attribute descriptors 34 provide operating properties that define node properties of the node 38 associated with the cell location of the attribute descriptor 34 and/or define edge properties of the edge 40 associated with the cell location of the attribute descriptor 34. Pathway model 42 is generated based on the defined nodes 38 and edges 40.

Nodes 38 are generated by system modeler 12 (FIG. 1B) and associated with layout table 14 based on the cell locations of layout table 14. Each node 38 is associated with one of the cell locations such that each node is associated with a reference location in physical system 10. Nodes 38 can be associated with the cell locations in any desired manner. For example, nodes 38 can be generated such that each node 38 is associated with the centroids of a cell 26. Nodes 38 are associated with the cell location of the cell 26 that the node 38 is disposed within. For example, the node 38 overlaid on the cell 26 at row R2, column C4 is associated with that cell location.

Nodes 38 are associated with cells 26 disposed within the boundary defining layout table 14. In some examples, nodes 38 are not associated with cells 26 that define the boundary. It is understood, however, that nodes 38 can be associated with some types of boundary cells. For example, nodes 38 can be associated with cells 26 having transition indicators that transfer the travel path from the pathway model 42 based on layout table 14 to another pathway model based on another set of layout tables 14.

Each node 38 has node properties. The node properties are defined by the operating properties associated with the cell location of the node 38. The node properties are defined by rules from attribute descriptors 34 such that each node 38 provides the features of the reference location associated with the cell location of that node 38. For example, the node properties can indicate what is located at the reference location associated with that node 38, such as a product, a switch, a fire station, a stop sign, etc.

Edges 40 extend between and connect adjacent ones of nodes 38. Each end of each edge 40 is associated with one of nodes 38. Similar to nodes 38, edges 40 are associated with cell locations to define properties of the edges 40 based on operating parameters associated with the cell locations. In some examples, edges 40 can be associated with the cell locations of each of the adjacent nodes 38 connected by that edge 40.

Each edge 40 has edge properties based on features of the reference location associated with the cell location of that edge 40. Each edge 40 has a directionality that defines attributes of allowable travel along that edge 40. The edge properties can include, among others, a speed limit, a direction of travel, who or what is allowed to travel on that edge, etc. The edge properties are defined by the rules associated with the same cell location as the edge 40. Edges 40 represent potential paths within the physical system 10.

The paths associated with edges 40 can be travel paths or access paths, depending on the node properties of the nodes 38 connected by the edge 40. For example, edges 40 associated with occupied cell locations (e.g., the first cell 26 at row R3, column C8) can be defined as access paths, while paths associated with unoccupied cells 26 (e.g., the second cell 26 at row R3, column C9) can be defined as travel paths. Access paths allow navigation to the occupied node 38 but prevent travel through the occupied node 38. Travel paths are pathways that allow movement through the respective cell location.

While edges 40 are shown as extending between directly adjacent nodes 38 (i.e., nodes 38 associated with directly adjacent cells 26), it is understood that some examples include edges 40 extending between diagonally adjacent nodes 38. For example, edges 40 can extend between nodes 38 associated with diagonally adjacent cells 26, such as an example edge 40 extending between node 38 of cell 26 at row R4, column C6 and node 38 of cell 26 at row R5, column C7. The properties of diagonal edges 40 can be based on the properties associated with the cell locations of nodes 38 that are directly adjacent to the diagonally adjacent nodes 38. For example, the location of node 38 at row R4, column C7 and the location of node 38 at row R5, column C6 do not include rules that prohibit travel through those locations. A diagonal edge 40 can thus be generated between node 38 at row R4, column C6 and node 38 at row R5, column C7. A diagonal edge 40 can also be prohibited by operating properties associated with the directly adjacent locations. For example, a diagonal travel path between node 38 at row R8, column C6 and node 38 at row R7, column C7 can be prevented from forming due to the operating parameters associated with the directly adjacent node 38 at row R7, column C6 indicating that that cell location is occupied such that travel cannot be completed through that location. Diagonal edges 40 can have different lengths than other edges 40 to provide additional information for the shortest path determination.

System modeler 12 is configured to generate pathway model 42 based on layout tables 14. Pathway model 42 is generated based on the defined nodes 38 and edges 40. Nodes 38 and edges 40 of directed graph 36 are generated and defined based on operating properties from layout table 14. Properties of the nodes 38 and edges 40 are defined based on the relative cell locations of the nodes 38 and edges 40. Operating rules from the cells 26 define the properties of the nodes 38 and/or edges 40 that are associated with the cell location of that cell 26. Pathway model 42 provides multiple candidate pathways between the cell locations. Pathway model 42 thereby provides multiple candidate pathways between reference locations in the physical system.

System modeler 12 (FIG. 1B) associates nodes 38 with cell locations of layout table 14. Node properties are defined based on the operating rules from layout table 14. For each node 38, system modeler 12 can recall attribute descriptors 34 from the cell 26 associated with that node 38. System modeler 12 determines operating rules based on the attribute descriptor 34. System modeler 12 configures the node properties of that node 38 based on relevant ones of the operating rules.

System modeler 12 associates edges 40 with cell locations of layout table 14. Edge properties are defined based on the operating parameters from layout table 14. For each edge 40, system modeler 12 can recall attribute descriptors 34 from the cell 26 associated with that edge 40. System modeler 12 can determine operating rules based on the attribute descriptor 34. System modeler 12 configures the edge properties of that edge 40 based on relevant ones of the operating rules.

An example of generating path data is discussed in more detail. In the example discussed, a bounded area is defined by the operating parameters from layout tables 14a-14d (FIGS. 2A-2D). By way of example, the components of directed graph 36 associated with a first cell location at row R3, column C8 and the components of directed graph 36 associated with a second cell location at row R3, column C9 are discussed in more detail.

A first node 38a of directed graph 36 is associated with the first cell location. System modeler 12 recalls attribute descriptors 34 from cells 26 associated with the first cell location. Attribute descriptors 34 from those cells 26 in layout table 14a (FIG. 2A) indicate that the reference location associated with the first cell location is occupied by a shelving unit holding certain items. Attribute descriptors 34 from those cells 26 in layout table 14b (FIG. 2B) indicate that the first cell location is accessible from directly adjacent cell locations to the left and right of the first cell location. Attribute descriptors 34 from those cells 26 in layout table 14d (FIG. 2D) indicate that a first time delay is associated with accessing that location. The cell 26 in layout table 14c (FIG. 2C) associated with the first cell location is blank. The empty condition of that cell 26 in layout table 14c is an attribute descriptor 34 that indicates a null value. The null value indicates a base configuration and does not further define the first node 38a. Operating rules are applied to first node 38a based on the attribute descriptors 34 to configure first node 38a.

System modeler 12 configures the first node 38a based on the attribute descriptors 34. Node 38a is configured as an access node that can be accessed from other cell locations but cannot be traversed between cell locations. Node 38a is configured such that any route that accesses node 38a is going to include a temporal delay associated with that route when accessing node 38a.

First edge 40a and second edge 40b extend between first node 38a and directly adjacent ones of nodes 38. Similar to defining the properties of the first node 38a, first edge 40a and second edge 40b are defined based on attribute descriptors 34 from layout tables 14. The first cell location is accessible only by the cell locations directly adjacent to the left and right of the first cell location. As such, two edges 40 extend from and are connected to node 38a. First edge 40a extends between first node 38a and the directly adjacent node 38 at row R3, column C7. Second edge 40b extends between first node 38a and second node 38b, which is directly adjacent to first node 38a and disposed at row R3, column C9.

First edge 40a and second edge 40b define access paths such that a travel path cannot extend from the cell location at row R3, column C9 to the cell location at row R3, column C7 through the first cell location at row R3, column C8. Instead, any pathway between those two cell locations must extend along travel paths between those two locations.

Second node 38b is associated with the second cell location. System modeler 12 recalls attribute descriptors 34 from cells 26 associated with the second cell location. Attribute descriptors 34 from layout table 14a, layout table 14b, and layout table 14d associated with the second cell location indicate that the reference location associated with the second cell location is unoccupied. Attribute descriptor 34 from layout table 14c specifies that the second cell location is subject to unidirectional travel therethrough. Operating rules are applied to second node 38b based on the attribute descriptors 34 to configure second node 38b.

System modeler 12 configures the second node 38b based on the attribute descriptors 34. Node 38b is configured as a travel node that can be traversed between cell locations directly adjacent to the second cell location.

Third edge 40c of directed graph 36 extends between second node 38b and the directly adjacent node 38 at row R2, column C9. Fourth edge 40d of directed graph 36 extends between the second node 38b and the directly adjacent node 38 at row R4, column C9. Similar to defining the properties of second node 38b, the third edge 40c and fourth edge 40d are defined based on attribute descriptors 34 from layout tables 14. Attribute descriptors 34 associated with the second cell location define operating properties of the third edge 40c and fourth edge 40d. The directionality of third edge 40 and fourth edge 40 (as shown by the corresponding arrowheads) is altered based on the attribute descriptor 34 from layout table 14c. Each of third edge 40c and fourth edge 40d have a single directional indicator, restricting travel to unidirectional travel through the second cell location.

Each edge 40 extends between and is associated with multiple cell locations. For example, the second edge 40b extends between first node 38a and second node 38b and is associated with both the first cell location and the second cell location. The operating parameters associated with the first cell location allow an access edge 40b to extend between the first cell location and the second cell location. A travel edge cannot extend between the first cell location and the second cell location based on the first cell location being occupied, and because the second cell location restricts directional travel through the first cell location. For example, if the first cell location was unoccupied, an edge 40 would not extend between the first cell location and the second cell location due to the properties associated with the second cell location defining allowable travel therethrough.

Each node 38 of directed graph 36 and each edge 40 of directed graph 36 is defined based on the properties associated with the cell location of that node 38 or edge 40. Pathway model 42 is generated based on the defined nodes 38 and defined edges 40. Pathway model 42 is thus a fully defined directed graph that provides the path data. Pathway model 42 provides potential pathways between an origin one of nodes 38 and a destination one of nodes 38.

As shown, access ones of nodes 38 can be modeled differently than travel ones of nodes 38. In some examples, access nodes 38 are split based on the number of access edges 40 associated with that cell location. For example, access nodes 38 can be configured to connect to only a single edge 40, to prevent travel across the access node 38. In the example shown, the first cell location at row R3, column C8 (shown in dashed lines in FIG. 4B) is modeled as including two first nodes 38a that are each connected to an access edge 40. Modeling access nodes 38 as multiple nodes 38 each connected to only one edge 40 facilitates determining the shortest path from among the candidate pathways provided by pathway model 42. The candidate pathways extend between nodes 38 and are formed by edges 40.

During operation, the user can input a starting location and a destination location to system modeler 12. The user can input one or more destination locations such that some destination locations are intermediate locations between an ultimate starting location and an ultimate destination location. System modeler 12 generates shortest path data based on pathway model 42. In some examples, system modeler 12 is configured to apply an algorithm, such as Dijkstra's algorithm, to pathway model 42 to generate the shortest path information.

In some examples, system modeler 12 can be configured to generate the shortest path data based on a node count between an origin node 38 associated with the first reference location and a destination node 38 associated with the second reference location. System modeler 12 can count the number of nodes 38 along various ones of the pathways between the origin node 38 and destination node 38. The shortest path is determined based on the pathway having the lowest node count.

In some examples, navigation module 18 can count the distance along and/or number of edges 40 between the origin node 38 and the destination node 38. The length of each edge 40 can be based on the edge type for that edge 40. For example, travel edges 40 can be configured to have a length while access edges 40 can be configured without a length, as the user can access the access node 38 but not travel to the access node 38. Each travel edge 40 can have the same length as the other edges 40 or travel edges 40 can have differing lengths. The length of each travel edge 40 can be a distance parameter associated with the actual distance between the reference locations connected by the edge 40 or a temporal parameter associated with a time required to travel between the reference locations connected by the edge 40.

Pathway model 42 defines travel within the bounded area represented by layout tables 14. Pathway model 42 is generated based on layout tables 14 and based on the operating parameters provided by the data in the cells 26 of the layout tables 14. Multiple pathway models 42 for a single bounded area can be generated based on different configurations of layout tables 14 to facilitate optimization within the physical system 10. Physical systems can be subdivided into one or more bounded areas that can each be defined by layout tables 14 and pathway model 42. Each pathway model 42 can be linked together (e.g., by travel edges 40 connecting nodes 38 disposed cell locations having transfer indicators) to fully define the physical system. Each pathway model 42 can be individually updated and refined by manipulating the layout tables 14 defining the pathway model 42. As such, alterations can be modeled within one portion of the physical system and the effects within both that portion and the rest of the physical system can be determined. Pathway models 42 facilitate navigation throughout multiple bounded areas of the complex physical system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of generating a pathway model for a physical system, the method comprising:
    defining, by a computing device, components of a directed graph based on a first cell-based layout table, cells of the first cell-based layout table defining reference locations within a bounded physical system, wherein each component is one of a node of the directed graph and an edge of the directed graph, and wherein each component is defined by:
        associating, by the computing device, the component with a cell location of a cell of the first cell-based layout table;
        recalling, by the computing device, a first attribute descriptor from the cell of the first cell-based layout table based on the cell location of the cell within the first cell-based layout table, the first attribute descriptor providing a rule defining at least one of access to and travel relative to the cell location of the cell of the first cell-based layout table; and
        configuring, by the computing device, the component based on the first attribute descriptor; and
    generating, by the computing device, a plurality of pathways between the reference locations based on the defined components.

2. The method of claim 1, further comprising:
    determining, by the computing device, a shortest pathway between a first one of the reference locations and a second one of the reference locations from among the plurality of pathways.

3. The method of claim 2, further comprising:
    determining, by the computing device, the shortest pathway based on a node count between an origin node associated with the first reference location and a destination node associated with the second reference location.

4. The method of claim 2, further comprising:
    outputting, via a user interface of the computing device, a representation of the shortest pathway.

5. The method of claim 2, further comprising:
    outputting, by a remote computing device, a representation of the shortest pathway.

6. The method of claim 1, wherein each component is further defined by:
    recalling, by the computing device, a second attribute descriptor from the first cell-based layout table based on the cell location of the first cell-based layout table; and
    configuring, by the computing device, the component based on the second attribute descriptor.

7. The method of claim 1, wherein each component is further defined by:
    associating, by the computing device, the component with a cell location of a second cell-based layout table;
    recalling, by the computing device, a second attribute descriptor from the second cell-based layout table based on the cell location of the second cell-based layout table; and
    configuring, by the computing device, the component based on the second attribute descriptor.

8. The method of claim 1, wherein configuring, by the computing device, the component based on the first attribute descriptor comprises:
    configuring the component into a base configuration based on the first attribute descriptor being a null value recalled from an empty cell.

9. The method of claim 8, further comprising:
    defining, by the computing device, a first node forming the component as a travel node capable of being traversed based on the null value.

10. The method of claim 1, further comprising:
    defining, by the computing device, a first node forming the component as an access node incapable of being traversed based on the first attribute descriptor.

11. The method of claim 1, further comprising:
    defining, by the computing device, a directionality of a first edge forming the component.

12. The method of claim 11, further comprising:
    defining, by the computing device, the directionality of the first edge as unidirectional based on the first attribute descriptor.

13. The method of claim 11, further comprising:
    defining, by the computing device, the first edge as an access edge based on the first attribute descriptor.

14. The method of claim 11, further comprising:
    defining, by the computing device, the first edge as a travel edge based on the first attribute descriptor.

15. The method of claim 1, further comprising:
    applying, by the computing device, a temporal property to the component based on the first attribute descriptor.

16. A method of generating candidate pathways between locations within a physical system, the method comprising:
    defining, by a computing device, components of a first directed graph based on first attribute descriptors extracted from cells of a first cell-based layout table, the cells of the first cell-based layout table defining reference locations within a first bounded area of the physical system, wherein each component of the first directed graph is one of a first node of the first directed graph and a first edge of the first directed graph, and wherein the first attribute descriptors define travel rules for the reference locations defined by the cells of the first cell-based layout table;
    defining, by the computing device, the components of the first directed graph based on second attribute descriptors extracted from cells of a second cell-based layout table, the cells of the second cell-based layout table further defining the reference locations within the first bounded area of the physical system, wherein the second attribute descriptors define travel rules for the reference locations defined by the cells of the second cell-based layout table; and generating, by the computing device, a pathway model of the physical system based on the defined components.

17. A system modeler configured to generate pathways within a physical system, the system modeler comprising:

a computing device including first control circuitry and a first memory, the computing device configured to:

recall, from the first memory, a plurality of cell-based layout tables having cell locations associated with reference locations of the physical system;

associate components of a directed graph with the cell locations;

define properties of the components based on attribute descriptors taken from the cells of the plurality of cell-based layout tables, wherein the attribute descriptors define travel rules for the reference locations defined by the cells of the plurality of cell-based layout tables; and generate path data regarding a plurality of pathways between the reference locations based on the defined properties of the components;

wherein each component is one of a node of the directed graph and an edge of the directed graph.

18. The system modeler of claim 17, wherein the computing device is configured to connect the edges between directly adjacent ones of the nodes.

19. The system modeler of claim 17, further comprising:

a remote computing device including second control circuitry and a second memory, the remote computing device configured to:

receive route information regarding a route;

determine an origin node associated with the route and a destination node associated with the route; and generate shortest path information between the origin node and the destination node based on the path data.

20. The system modeler of claim 19, wherein the remote computing device is configured to output, via a user interface of the remote computing device, the shortest path information.

* * * * *